Aug. 26, 1969

G. J. COOLEY ET AL 3,463,869

REFRIGERATED UNDERGROUND TRANSMISSION LINE AND PROCESS

Filed July 13, 1966

INVENTORS
GERALD J. COOLEY
THOMAS E. CORMIER
PETER A. SIPPLE

BY Shanley & O'Neil
ATTORNEYS

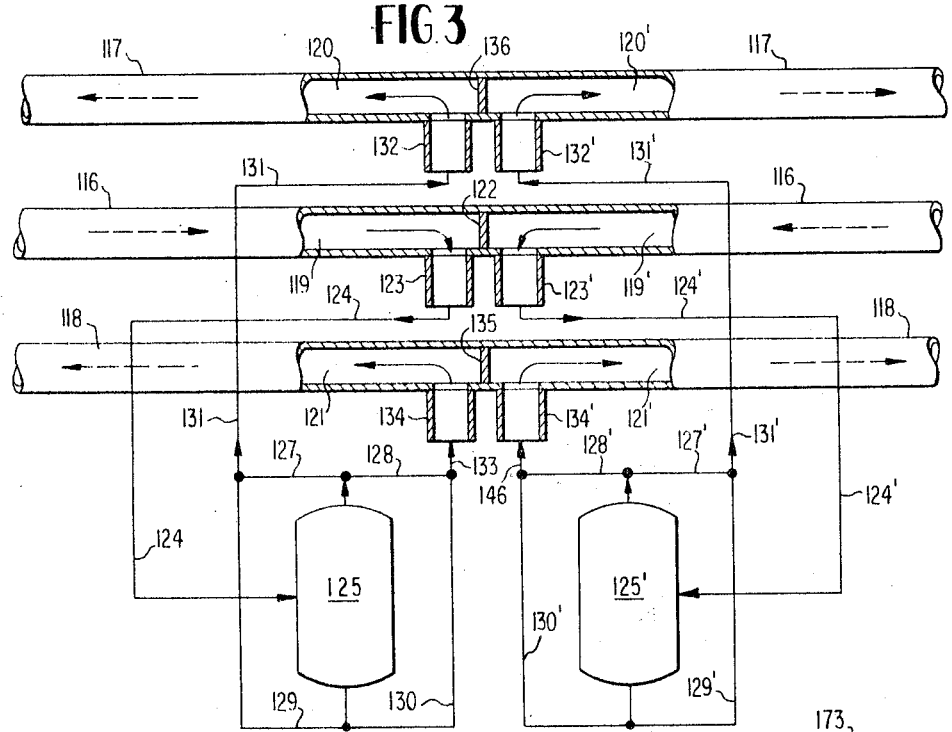
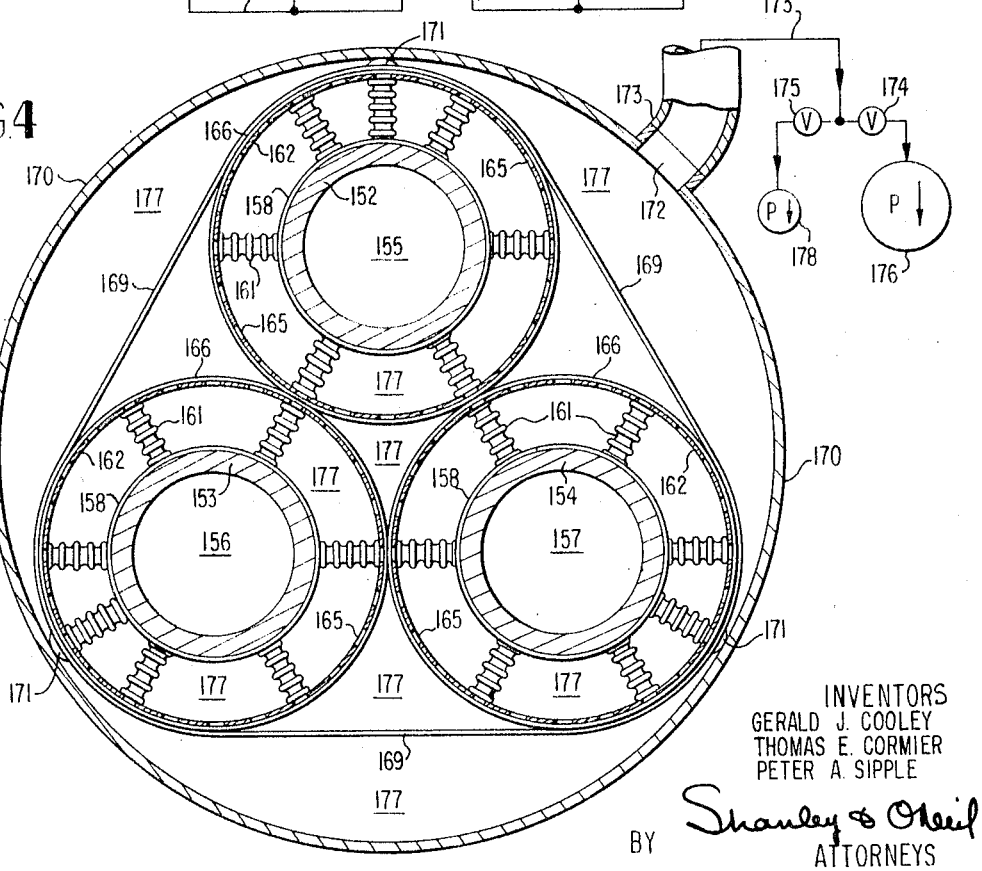

United States Patent Office 3,463,869
Patented Aug. 26, 1969

3,463,869
REFRIGERATED UNDERGROUND TRANSMISSION LINE AND PROCESS
Gerald J. Cooley and Thomas E. Cormier, Allentown, and Peter A. Sipple, Macungie, Pa., assignors to Air Products and Chemicals, Inc., Allentown, Pa.
Filed July 13, 1966, Ser. No. 564,969
Int. Cl. H01b 7/34, 9/06
U.S. Cl. 174—15                          16 Claims

ABSTRACT OF THE DISCLOSURE

A refrigerated electrical transmission line operating in the non-superconductive range, which utilizes a subcooled liquid at superatmospheric pressure, whereby the conductor is first cooled by the sensible heat of subcooling and then cooled by the latent heat of vaporization. The vapor is then expanded rapidly so as to recover and utilize the refrigeration of expansion.

---

This invention relates to electrical transmission lines and more particularly to improvements on underground refrigerated electrical transmission lines.

Underground high voltage electrical transmission lines are rarely installed, unless required by law, although they possess advantages with respect to reliability, safety and appearance, because of their relatively low efficiency and relatively high cost of installation as compared to aerial transmission lines. Prior underground transmission lines are capable of transmitting only a fraction of the power transmitted by an aerial transmission line of equal size since the heat dissipation of soil is low as compared to air. The heat generated by the flow of current through the conductors, if not dissipated, will increase the resistivity of the conductors resulting in further power loss and increased heat generation. Attempts have been made in the past to overcome the heat dissipation problem of underground transmission lines by circulating water, air or oil through the lines; however, such systems have not proven practicable as the limited improvement in heat dissipation obtained did not provide a system comparable with aerial transmission lines in terms of quantities of power transmitted and unit transmission costs. And, while it has been suggested that the conductors of underground transmission lines may be deeply refrigerated by the use of liquid air, no practicable system has been proposed except the use of liquid helium to obtain super-conductivity transmission in laboratory type equipment. In view of the ever-increasing demands of electrical power and the present and future necessity to install aerial transmission lines over populated areas, the advantages of underground transmission lines of efficiencies comparable to aerial transmission lines are clearly manifest.

It is therefore an object of the present invention to provide a novel process and apparatus for low temperature refrigeration of underground transmission lines.

Another object is to provide a novel underground transmission line and process which overcome the disadvantages of prior underground transmission lines and provide for the underground transmission of electrical power comparable with aerial transmission lines in terms of quantities of power transmitted and unit transmission costs.

Other objects and features of the present invention will appear from the following detailed description considered in connection with the accompanying drawings which discloses several embodiments of the invention; it is to be understood the drawings are for purposes of illustration only and not as a definition of the limits of the invention, reference for the latter purpose being had to the appended claims.

In the drawings, in which similar reference characters denote similar elements throughout the several views:

FIGURE 3 is a diagrammatic representation of still another embodiment of the invention; and FIGURE 4 is a view in vertical cross-section of an electrical transmission line embodying the principles of the invention.

Figure 1:
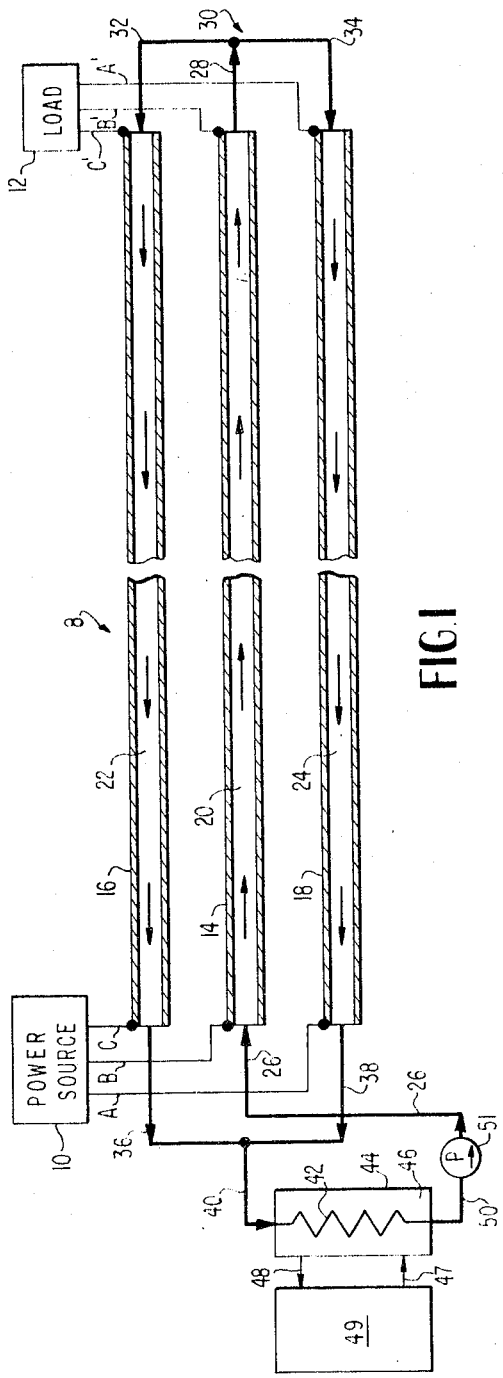
FIGURE 1 is a schematic showing of an electrical transmission line embodying the principles of the present invention.

FIGURE 1 of the drawings discloses a three phase electrical transmission system embodying the principles of the present invention including electrical power source 10 at a first location and a load 12 at a second location, which may be miles away, interconnected by an electrical transmission line 8. The transmission line 8 comprises three tubular conductors 14, 16 and 18 connected to the power source 10 by connectors A, B and C, respectively, and to the load 12 by connectors A', B' and C', respectively. The tubular conductors 14, 16 and 18 provide means defining passageways 20, 22 and 24, respectively, for passing refrigerant in heat exchange relationship with conductors throughout their length. Refrigerant is introduced by conduit 26 into the passageway 20 at the power source end of the conductor 14 and the refrigerant is withdrawn from the passageway at the load end of the conductor by conduit 28. The conduit 28 is connected at point 30 to branch conduits 32 and 34 respectively connected to the passageways 22 and 24 at the load end of conductors 16 and 18, respectively. At the power source end of the conductors 16 and 18, the passageways 22 and 24 are respectively connected to conduits 36 and 38 joined to a common conduit 40 feeding coil 42 of heat exchange device 44 having a shell space 46 connected by conduits 47 and 48 to a refrigeration producing device 49. The other end of the coil 42 is connected by conduit 50 to the suction inlet of a pump 51 and the discharge outlet of the pump is connected to the conduit 26. The conduits 26, 28, 32, 34, 36, and 38 are electrically insulated from respective conductors 14, 16 and 18 by any suitable means such as by employing electrically insulating coupling means or by forming the conduits of dielectric material.

In accordance with the principles of the present invention, the refrigerant entering the passageway 20 through the conduit 26 is at least partially liquefied and the mass of the refrigerant is established in accordance with the heat load to effect a phase change of the fluid upon flow of the refrigerant through the passageways 20, 22 and 24 and thereby aids in cooling the conductors by the latent heat of phase transformation. Thus, in accordance with the principles of the present invention, the source of refrigerant introduced by the conduit 26 comprises a normally gaseous material cooled to a low temperature at least equal to the liquefaction temperature of the normally gaseous material at the existing pressure. The refrigerant may be a fluid comprising a vapor phase and a liquid phase; a fluid totally in liquid phase, in which case the maximum latent heat of transformation from the liquid phase to the vapor phase would be obtained; a fluid comprising a subcooled liquid, in which case the latent heat of subcooling would also aid in cooling the conductors; or, a slurry comprising a mixture of liquid and solid phases, in which case the latent heat of sublimation or melting of the solid phase would also aid in cooling the conductors. The region along the length of the flow of the refrigerant through the conductors, at which point the phase change or changes begin and end, will depend upon variants of the system including the material of the refrigerant and its phase composition. In any event, in accordance with the principles of the present invention, the phase change or changes occur upon flow of the refrigerant through the passageways of the conductors with the refrigerant substantially completely in vapor phase exiting from the power source ends of the conductors 16 and 18.

In accordance with another feature of the present invention, the refrigerant entering the passageway 20 by conduit 26 is maintained under a relatively high superatmospheric pressure as compared to the refrigerant exiting from the passageways 22 and 24 by way of the conduits 36 and 38, and it is preferable that the refrigerant leave the passageways 22 and 24 under a low superatmospheric pressure. The maintaining of a pressure differential between the input refrigerant and the exiting refrigerant permits refrigerant vapors to expand upon their flow through the passageways of the conductors, thereby providing additional refrigeration for cooling the conductors. It will be appreciated that, while the concept of employing phase transformation and the concept of effecting expansion of refrigerated vapor individually aid in cooling the conductors, the concepts interact to obtain maximum cooling effect. In this regard, it has been determined that the efficiency of low temperature cooled electrical transmission lines is materially improved by maintaining the conductors at the lowest possible temperature with minimum temperature difference between the conductors at common points along the length of the transmission line. This result is achieved by the concepts of cooling the conductors by phase transformation and vapor expansion and without relying upon heat interchange between the conductors. Thus, in accordance with the present invention, the mass of the refrigerant flowing through the passageways of the conductors is determined in accordance with variables of the system including heat load and characteristics of the refrigerant to maintain substantially equal the temperature of the refrigerant entering the conduit 26 and exiting from the conduits 36 and 38. The temperature of the conductors at any common point along the length of the transmission line may be maintained without material differences and, although there will exist a temperature difference between the conductors at opposite ends of the transmission line, a gradual temperature gradient may be maintained to preclude abrupt changes in resistivity of the conductors and resulting disadvantageous effects on transmission efficiency. The exiting temperature of the refrigerant may be accurately established by controlling the exit pressure or by designing the system so that the exiting refrigerant is slightly in liquid phase.

It has been determined that a refrigeration source comprising subcooled liquid nitrogen provides the most efficient operation when practicing the principles of the present invention for cooling high power, underground transmission lines. The source of liquid nitrogen entering the system by conduit 26 may be under a pressure within the range of from 145 p.s.i.a. to 155 p.s.i.a., preferably about 150 p.s.i.a., and subcooled to a temperature within a range of about −290° F. to −310° F., preferably about −300° F., with the nitrogen exiting from the passageways 22 and 24 by way of conduits 36 and 38 substantially totally in vapor phase and under a pressure of about 45 p.s.i.a. to 50 p.s.i.a. at a temperature corresponding to the temperature of the entering subcooled liquid nitrogen. The nitrogen refrigerant exits from the load end of the passageway 20 by conduit 28 as a mixture of liquid and vapor phases or in vapor phase and the nitrogen refrigerant is preferably divided by conduits 32 and 34 for flow through the passageways 22 and 24. The difference in volume between nitrogen in vapor phase and liquid phase makes it possible to cool the conductors of a three phase transmission line to low temperature while maintaining close temperature approach between the conductors throughout the length of the transmission of appreciable length and without a material temperature difference between the ends of the transmission line. When practicing the invention with subcooled liquid nitrogen entering the conductor 26 at 150 p.s.i.a. and at −300° F., it is possible, assuming the transmission line to be five miles in length, to maintain the conductors at the load end of the transmission line at a temperature of about −260° F. with the temperature of the conductors along the length of the transmission line gradually varying, without substantial temperature difference therebetween, between the limits of −260° F. and −300° F. While the resistivity of electrically conducting material varies with temperature, the resistivity of copper and aluminum, metals that are practicable for use in high power transmission lines, is quite low and there is a very small difference in resistivity between the temperature of −260° F. and −300° F. Thus, the use of subcooled liquid nitrogen refrigerant cools the conductors of the transmission line to a small range of very low temperatures to obtain low resistivity in a region where resistivity changes slightly with temperature. Thus, the resistivity of the conductors may be considered to be substantially uniform throughout the length of the transmission line with respect to electrical transmission efficiency.

The relative cross-sectional area of the passageways of the coductors are proportioned in accordance with the designed mode of operation considering the material and the phase composition of the refrigerant to achieve uniform cooling of the conductors throughout their length. Although the invention is disclosed in the environment of a three phase transmission line, it will be appreciated that the principles of the invention are applicable to two-conductor transmission lines in which case the passageways would be designed to carry the relative volume of flows involved. Furthermore, while subcooled liquid nitrogen is the preferred refrigerant, it is to be understood that liquid nitrogen may be employed as well as other liquefiable gases or gaseous mixtures as well as liquid solid mixtures such as a slurry of liquid nitrogen and solid argon.

Figure 2:
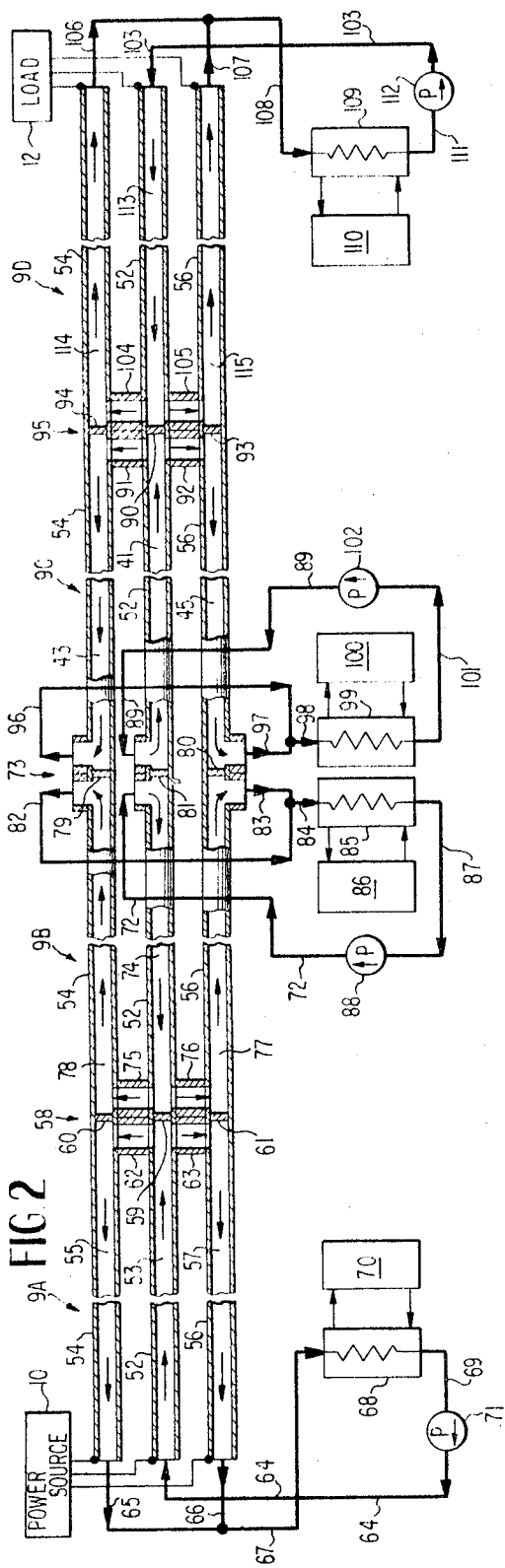
FIGURE 2 is a diagrammatic showing of another embodiment of the invention.

The embodiment of the invention illustrated in FIGURE 2 of the drawings comprises a transmission line cooled by a plurality of refrigeration systems 9A, 9B, 9C, and 9D, each similar to the system of FIGURE 1. The arrangement of FIGURE 2 has special utility in situations where the distance between the power source and the load is so great as to render the use of a single system inefficient due to heat load and pressure drop. As shown, the transmission line includes tubular conductors 52, 54 and 56 extending between the power source 10 and the load 12 and each having electrical connections at opposite ends with the power source and the load. At the region 58 between the systems 9A and 9B, bulkheads 59, 60 and 61 close the tubular conductors 52, 54 and 56, respectively, and form passageways 53, 55 and 57 of the system 9A and, adjacent the region 58, conduits 62 and 63 form communication between the passageway 53 and the passageways 55 and 57. At the other end of the system 9A, the passageway 53 is fed with refrigerant by conduit 64 and the passageways 55 and 57 are connected by conduits 65 and 66, respectively, and common conduit 67 to heat exchange device 68 from which the cooled refrigerant is passed by conduit 69 to pump 71 which feeds the refrigeration inlet conduit 64, device 70 providing the required refrigeration. At region 73, the conductors 52, 54 and 56 are closed by bulkheads 81, 79 and 80, respectively, to form passageways 74, 77 and 78 of the system 9B, and conduits 75 and 76 are formed adjacent the region 58 to establish fluid communication between the passageway 74 and the passageways 77 and 78. Refrigeration for the system 9B is supplied to the passageway 74 by conduit 72 and refrigerant exiting from the passageways 78 and 77 flows through conduits 82 and 83, respectively, common conduit 84, heat exchange device 85 and conduit 87 to pump 88 which feeds the inlet conduit 72, device 86 providing the refrigeration. At region 95 between systems 9C and 9D, the conductors are closed by bulkheads 90, 93 and 94 to provide passageways 41, 43 and 45 of the system 9C and passageways 113, 114 and 115 of the system 9D. Conduits 91 and 92 are located adjacent the region 95 to form communication between the passageway 41 and the passageways 43 and 45 of the system 9C, and conduits 104 and 105 are provided to establish communication between the passageway 113 and the passageways 114 and 115 of the system 9D adjacent the region 95. The systems 9C and 9D are both provided with a separate refrigeration source. Pump 102 feeds refrigeration to the passageway 41 of the system 9C by way of conduit 89 and the refrigerant exiting from the passageways 43 and 45 is conducted by conduits 96, 97 and 98 to the heat exchange device 99 connected by conduit 101 to the pump 102, device 100 producing the necessary refrigeration. Likewise, pump 112 feeds refrigerant to the passageway 113 of the system 9D by way of conduit 103 and refrigerant exiting from the passageways 114, 115 is conducted by conduits 106, 107 and 108 to heat exchange device 109 and, hence by conduit 111 to the pump 112, device 110 providing the required refrigeration.

Each of the systems 9A, 9B, 9C and 9D may be operated in accordance with any of the modes of operation described above in connection with FIGURE 1; however, it is preferable that each of the systems operate under the same mode. The feature of arranging the systems 9A, 9B, 9C, and 9D so that adjacent ends are at substantially the same temperature obtains a temperature gradient which gradually varies between closely spaced low temperature levels throughout the length of the transmission line between the power source and the load thereby precluding abrupt changes in resistivity of the conductors with attendant adverse effect upon transmission efficiency. As in the case of the FIGURE 1 system, the refrigerant carrying conduits, including the conduits 62, 63, 75, 76, 91, 92, 104, and 105, would be electrically insulated from the conductors such as by use of dielectric material, for example.

The arrangement shown in FIGURE 3 for transferring refrigerant withdrawn from the passageway of one conductor to the passageway of one or more other conductors has special utility in situations where the withdrawn refrigerant comprises a mixture of different phases, such as liquid phase and vapor phase, and makes it possible to accurately proportion the withdrawn mixed phase refrigerant between multiple passageways. As shown, tubular electrical conductors 116, 117 and 118 are closed by bulkheads 122, 136 and 135, respectively, to provide passageways 119, 120 and 121 of one system and passageways 119′, 120′ and 121′ of an adjacent system. Multi-phase refrigerant is withdrawn from passageway 119 and conducted by conduit 124 to phase separator 125 from which the vapor phase is withdrawn and divided into substantially equal parts by conduits 127 and 128 and from which the liquid phase is withdrawn and divided into substantially equal parts by conduits 129 and 130. The liquid phase in conduit 129 and the vapor phase in conduit 127 are merged in conduit 131 and conducted thereby for introduction through conduit 132 into the passageway 120. Likewise, the liquid and vapor phases in conduits 130 and 128 are merged in conduit 133 and introduced through conduit 134 into the passageway 121. Conduits 123, 132 and 134 may be of dielectric material or otherwise electrically insulated from respective conductors. A similar arrangement, in which the parts are identified by primed reference characters, is provided for transferring mixed phase refrigerant withdrawn from passageway 119′ into passageways 120′ and 121′.

Structural details of a three phase electrical transmission line according to the present invention are shown in FIGURE 4. As shown, the transmission line comprises three tubular conductors 152, 153 and 154 defining passageways 155, 156 and 157, respectively, for the flow of refrigerant in heat interchange with each conductor. A plurality of bands 157 which may be of insulating material are disposed about each conductor in spaced relation along its length to support the inner ends of a plurality of radially disposed insulator posts 161. The outer ends of the insulator posts 161 of each conductor support an electrostatic shield 162 which extends about the conductor throughout its length. The electrostatic shields function to equalize the electrical potential between the conductors and the shields and assist in preventing electrical discharges from the conductors, and are provided with apertures for a purpose that will be described below. A plurality of support rings 166 are provided about and in spaced relation along each electrostatic shield 162, in the plane of each set of insulator posts 161, to support the outer ends of the insulator posts and to strengthen the electrostatic shields. The conductors with their electrostatic shields are joined together in a unitary assembly by a plurality of banding straps 169, spaced along the length of the conductors and each overlying a support ring 166 of each conductor. The unitary assembly is disposed in a housing conduit 170 which defines a vacuum-tight chamber 177 enclosing the conductors and the confined passageways for conducting refrigerant in heat interchange with the conductors. Skids 171, preferably of electrically conductive material, are provided on the outer extremities of the support rings 166 to facilitate assemblage.

The chamber 177 communicates through opening 172 and conduit 173 with vacuum producing means including a mechanical vacuum pump 176 and ion pump 178 through valves 174 and 175, respectively. The space 177 may be evacuated by closing valve 175 and opening valve 174 and operating the mechanical vacuum pump 176 to establish a pressure of about $10^{-3}$ millimeters of mercury within the chamber 177. Thereupon, valve 174 is closed and valve 175 is opened and the ion pump 178 operated to further decrease the pressure in the chamber. After a lower vacuum is obtained, such as about $10^{-5}$ millimeters of mercury, the chamber is purged by carbon dioxide, nitrogen or other suitable fluid, and circulation of refrigerant through the passageways of the conductors is preferably initiated to produce a cryopumping effect which aids the ion pump 178 in lowering the pressure in the chamber to below $10^{-6}$–$10^{-8}$ millimeters of mercury. During operation of the transmission line, valve 175 may be left open so that ion pump 178 may remove gas molecules which stray through opening 172 and getters may be employed to aid in maintaining the vacuum. Apertures 165 in the electrostatic shields facilitate evacuation of the space within and between the electrostatic shields.

The feature of the present invention of maintaining evacuated space about each conductor and the passageways for flowing refrigerant in heat exchange with the conductors obtains electrical insulation of the conductors and thermal insulation of the refrigerant flowing through the passageways. In order to further facilitate evacuation of the chamber 177, the electrostatic shields may be slightly spaced apart from each other by metal posts at their point of tangency. Also, the chamber 177 may be divided along the length of the unitary assembly into individual vacuum-tight sub-chambers, of about 100 or more feet in length, and separate vacuum producing means, similar to that shown in FIGURE 4, provided for each sub-chamber.

The tubular conductors 152, 153 and 154 are preferably of copper; however, aluminum or other metal which is of high electrical conductivity for use in long-distance electrical power transmission lines, may be utilized. Preferably, irrespective of the material from which the conductors are fabricated, the surfaces of the conductors and the surface of the conduit 170 which define the walls of the chamber 177 or are otherwise exposed to the vacuum comprises a high electron work level material, that is, a material which has an atomic structure such that a large amount of energy is required to extract electrons from the outer electron surface, nickel for example. Such use of high electron work level material minimize concentration of electrons and current flow across the evacuated space. The electrostatic shields preferably take the form of nickel-plated, perforate aluminum or nonmagnetic stainless steel tubes, with about 20% of the surface area being open due to perforation.

In a specific example of operation of a process according to the invention, three phase alternating current at 4325 mva. and 500 kv. is transmitted about five miles from a power source to a load. The transmission line is constructed as shown in FIGURE 4 with six-inch diameter copper tubes as conductors and with the chamber defined by the housing conduit 170 being maintained under a vacuum of about $10^{-8}$ millimeters of mercury. The refrigeration system is arranged in the manner shown in FIGURE 1 and the refrigerant source is liquid nitrogen under a pressure of about 150 p.s.i.a. and subcooled to a temperature of about $-300°$ F. The nitrogen refrigerant leaves the passageways 36 and 38 at about 47 p.s.i.a. and $-300°$ F. and is liquefied and subcooled upon flowing through the heat exchange device 44 and then increased in pressure to about 150 p.s.i.a. by the pump 51 and recycled through the transmission line. The subcooled liquid nitrogen flows to the passageway 20 at the rate of about 100 gallons per minute and the conductors at the load end of the transmission line are maintained at a temperature of about $-260°$ F. The total refrigeration required is about 195 tons supplied by the device 49. The systems 9A, 9B, 9C, and 9D of FIGURE 2 may be operated in a similar manner.

There is thus provided by the present invention a low temperature electrical transmission line and process which obtains the transmission of electrical power at such materially reduced unit transmission costs as to make economically feasible the use of underground transmission lines. Although several embodiments of the invention have been disclosed and described, it is to be understood that various changes and substitutions may be made without departing from the spirit of the invention. For example, solid conductors may be employed with means surrounding the conductors to form passageways for flowing refrigerant in heat interchange with the conductors. Also, in place of a separate refrigerattion device 49 and a heat exchange device 44, as shown in FIGURE 1, the exiting refrigerant from the transmission line may be fed to a liquefier supplying liquefied refrigerant directly to the pump 51. Reference therefor will be had to the appended claims for a defintion of the limits of the invention.

What is claimed is:
1. A low temperature process for cooling conductors of an electrical transmission line extending between remotely spaced first and second locations comprising the steps of:
(a) providing a source of normally gaseous refrigerant at superatmospheric pressure subcooled to a temperature substantially below its liquefaction temperature at said superatmospheric pressure; said subcooled temperature being substantially above the superconductivity temperature of said conductors,
(b) passing said subcooled refrigerant from the source along one of said conductors in heat exchange therewith in a direction toward said second location,
(c) warming said subcooled refrigerant by utilizing the sensible heat of the subcooled refrigerant to adsorb heat generated by said conductor,
(d) withdrawing said refrigerant from said first conductor at a point spaced from said first location and passing said refrigerant along a second conductor in heat exchange therewith in a direction toward said first location,
(e) withdrawing said refrigerant from said second conductor at a pressure substantially below said superatmospheric pressure, and
(f) maintaining the subcooled temperature of the refrigerant from said source, the superatmospheric pressure thereof and the substantially lower pressure at which it is withdrawn from said second conductor such that at least a substantial portion of said refrigerant is vaporized by adsorbing the heat generated by at least one of the conductors and such that additional heat generated by at least one of the conductors is adsorbed by expansion of said vaporized refrigerant.

2. A low temperature process as defined in claim 1, comprising the further step of
establishing the mass of the refrigerant passed in heat interchange with the conductors to maintain the refrigerant withdrawn from heat interchange with the second conductor at a temperature substantially equal to the temperature of the source.

3. A low temperature process as defined in claim 1 in which the source of refrigerant is a subcooled liquid nitrogen.

4. A low temperature process as defined in claim 1, comprising the further step of
passing some of the refrigerant withdrawn from heat interchange with the first conductor into heat interchange with a third conductor and passing it in heat exchange relationship with said third conductor in a direction toward said first location and then withdrawing refrigerant from heat interchange with the third conductor adjacent the first location.

5. A low temperature process as defined in claim 1, in which the refrigerant withdrawn from heat interchange with the first conductor is in liquid phase and in vapor phase,
and comprising the step of separating the liquid phase and the vapor phase of withdrawn refrigerant before passing the withdrawn refrigerant in heat interchange with the second conductor.

6. A low temperature process as defined in claim 1, in which said subcooled temperature is within a range of from about $-290°$ F. to about $-310°$ F.

7. A low temperature process as defined in claim 1 in which the difference between said superatmospheric pressure and said substantially lower pressure is in the order of 100 p.s.i.a.

8. A low temperature process as defined in claim 1 in which said refrigerant is liquid nitrogen subcooled to a temperature in the order of $-300°$ F.

9. A low temperature process as defined in claim 8 in which the difference between said superatmospheric pressure and said substantially lower pressure is in the order of 100 p.s.i.a 10. A cryogenic refrigeration system for cooling a plurality of electrical conductors extending between remotely spaced first and second locations comprising:
(a) a source of normally gaseous refrigerant at superatmospheric pressure subcooled to a temperature substantially below the liquefaction temperature of the refrigerant at said superatmospheric pressure and substantially above the superconductivity temperature of said conductors,
(b) means for supplying said subcooled refrigerant along one of said conductors in the heat exchange relationship therewith in a direction toward said second location for utilizing the sensible heat of the subcooled refrigent to adsorb heat generated by said conductor,
(c) refrigerant passage means for withdrawing refrigerant from heat exchange with said first conductor and passing said refrigerant toward said first location in heat exchange relationship with at least one other of said conductors, (d) means for withdrawing said refrigerant from said other conductor at a point adjacent said first location at a pressure substantially lower than said superatmospheric pressure, and (e) means for maintaining the subcooled temperature of the refrigerant, the superatmospheric pressure and substantially lower pressure thereof such that heat generated by at least one of the conductors is adsorbed by the latent heat of vaporization of the refrigerant and by expansion of the resulting vapor.

11. The cryogenic refrigeration system as claimed in claim 10 wherein said plurality of conductors comprise first, second and third conductors, and wherein said refrigerant is passed in heat exchange relationship with said first conductor in the direction toward said second location and returned in heat exchange relationship with said second and third conductors in the direction toward said first location.

12. The cryogenic refrigeration system as claimed in claim 11 wherein said conductors are cylinders and said refrigerant is passed along the interior of said conductors.

13. An electrical transmission line including a plurality of conductors extending between spaced first and second locations, means forming a confined passageway extending along each conductor conducting relatively cold normally gaseous material in heat interchange with the conductor, means for introducing cold normally gaseous material into the confined passageway of a first conductor adjacent the first location, means for withdrawing normally gaseous material from the confined passageway of the first conductor at a point displaced along the first conductor for the first location, means adjacent said point for introducing normally gaseous material withdrawn from the confined passageway of the first conductor into the confined passageway of a second conductor, means for withdrawing normally gaseous material from the passageway of the second conductor adjacent the first location, means forming an evacuated space enclosing each conductor and the means forming the confined passageway of each conductor, and means forming an electrostatic shield spatially enclosing each conductor and the means forming the confined passageway of each conductor.

14. An electrical transmission line as defined in claim 13 including high electron work level material forming surfaces of the electrostatic shields and the conductors exposed to the evacuated space.

15. An electrical transmission line as defined in claim 13 in which each conductor comprises a tubular member, and including means forming an electrostatic shield spatially enclosing each of the tubular members.

16. An electrical transmission line as defined in claim 15 including means forming a chamber enclosing the electrostatic shields and the tubular members, means for maintaining the chamber under vacuum, and means forming openings in the electrostatic shields.

References Cited

UNITED STATES PATENTS

| 11,865 | 10/1900 | Tesla | 174—15 X |
|---|---|---|---|
| 3,396,355 | 8/1968 | Hochart et al. | 336—94 |
| 2,173,717 | 9/1939 | Hobart. | |
| 2,953,623 | 9/1960 | McNulty. | |
| 3,162,716 | 12/1964 | Silver | 174—15 |
| 3,292,016 | 12/1966 | Kafka | 307—90 |

LEWIS H. MYERS, Primary Examiner

A. T. GRIMLEY, Assistant Examiner

U.S. Cl. X.R.

62—514; 174—16